June 22, 1965  J. PICANOL  3,190,318
MECHANISM FOR LOCKING AND UNLOCKING THE
SHUTTLE ON RISING BOX LOOMS Filed July 3, 1962  5 Sheets-Sheet 1

INVENTOR
JAIME PICANOL

BY *Richards & Geier*
ATTORNEYS

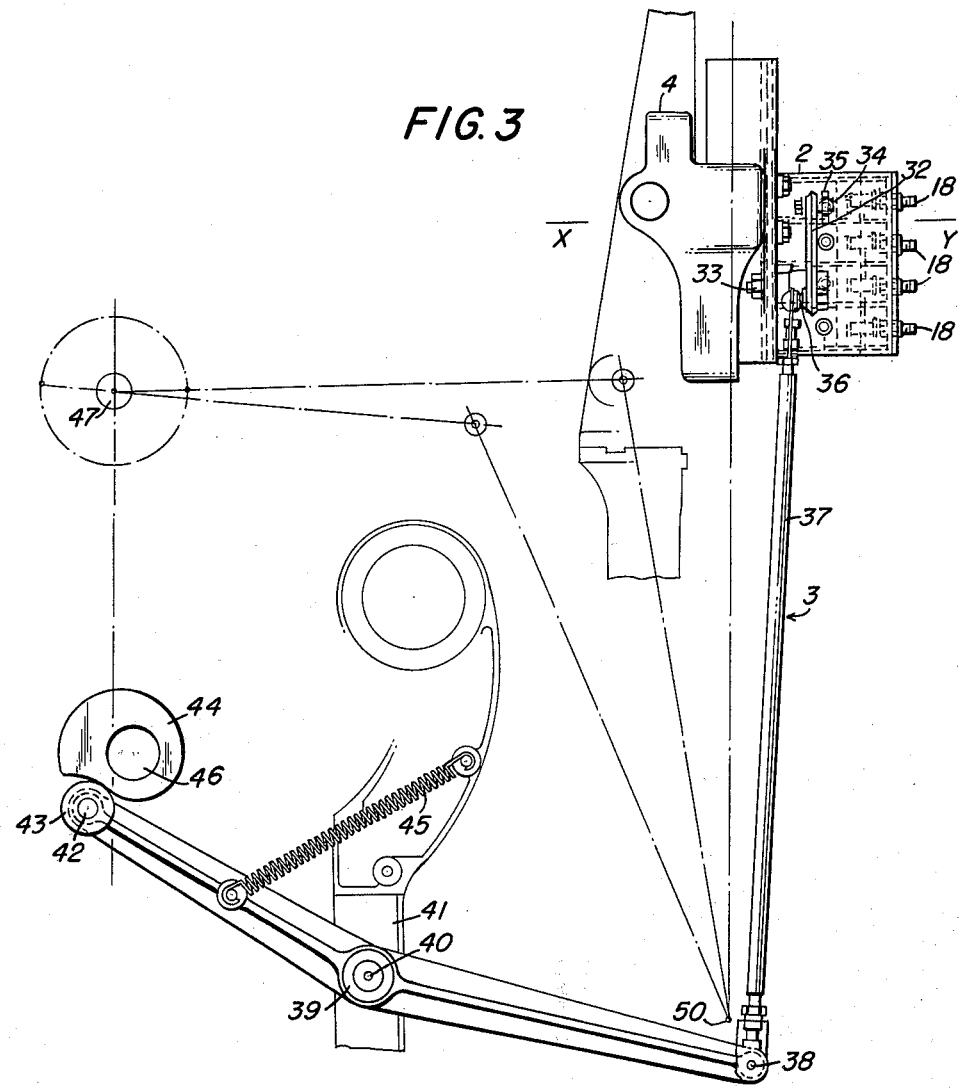

June 22, 1965
J. PICANOL
3,190,318
MECHANISM FOR LOCKING AND UNLOCKING THE
SHUTTLE ON RISING BOX LOOMS
Filed July 3, 1962
5 Sheets-Sheet 4
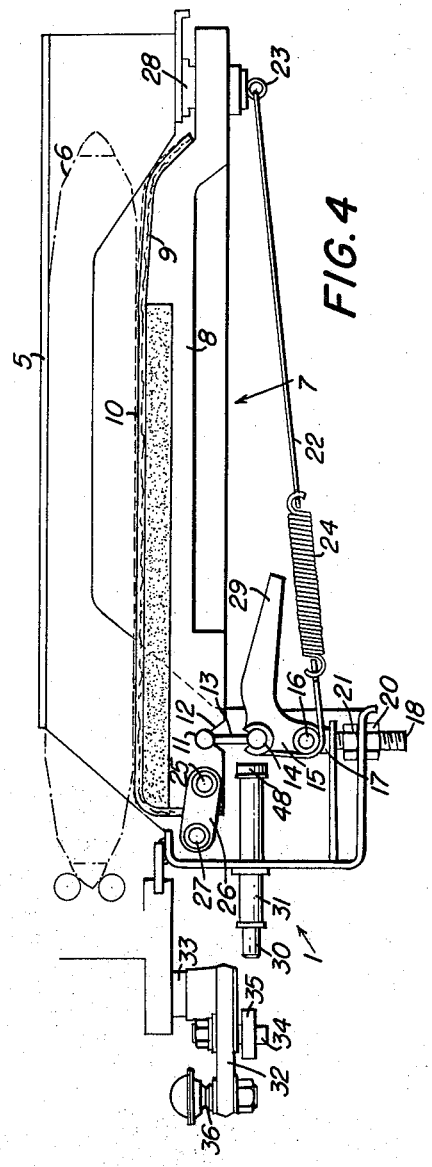
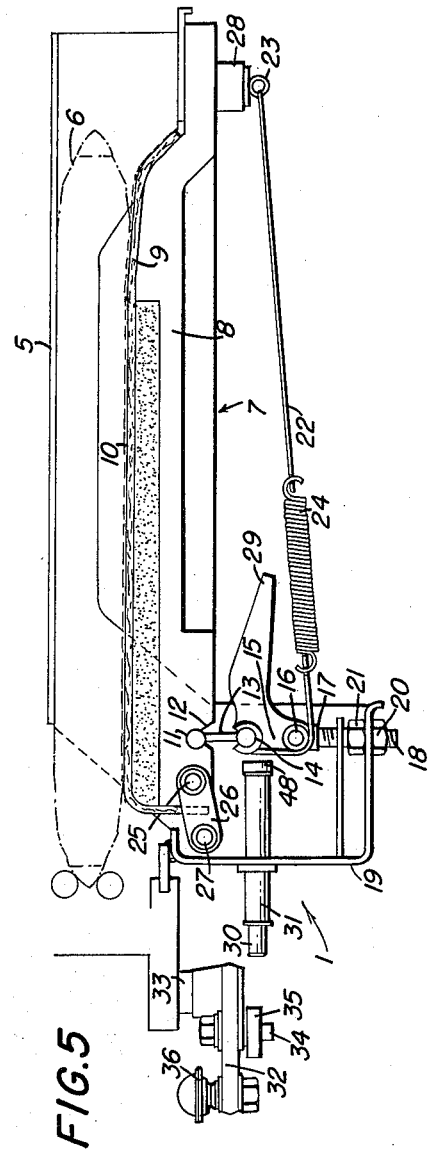
INVENTOR
JAIME PICANOL
BY *Richards & Geier*
ATTORNEYS

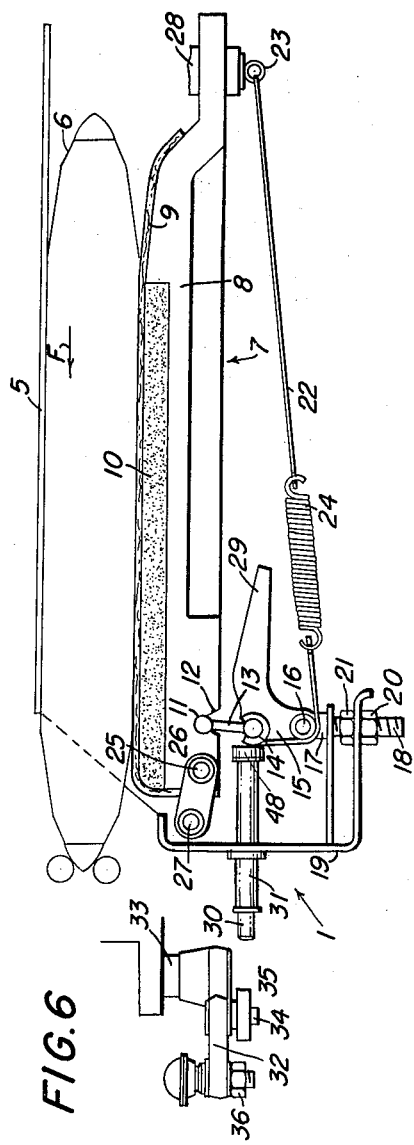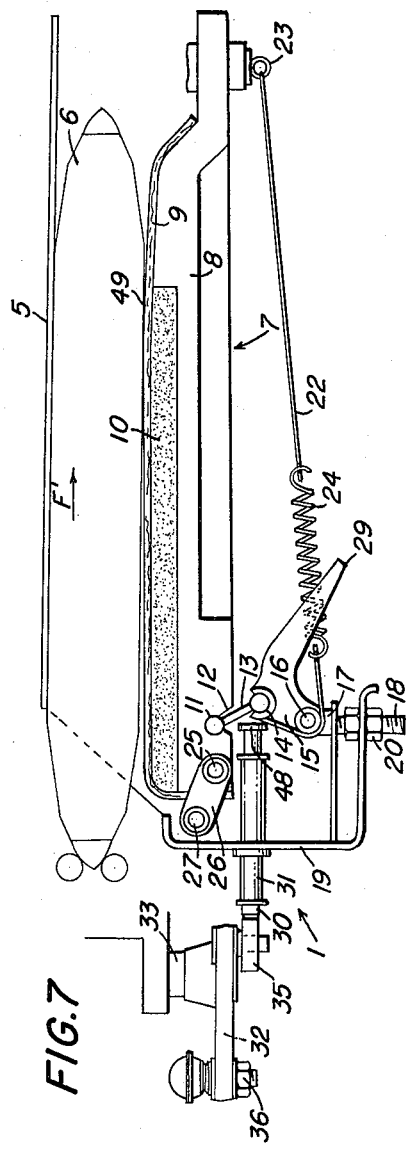

United States Patent Office 3,190,318
Patented June 22, 1965

3,190,318
MECHANISM FOR LOCKING AND UNLOCKING
THE SHUTTLE ON RISING BOX LOOMS
Jaime Picanol, "Casa Pairal Catalunya," Zandberg,
Zillebeke-lez-Ypres, Belgium
Filed July 3, 1962, Ser. No. 207,247
Claims priority, application Belgium, Mar. 20, 1962,
615,291
8 Claims. (Cl. 139—187)

The present invention concerns the problem of locking and unlocking the shuttle when the latter enters, respectively leaves, the rising box.

This problem is of particular importance when one has to deal with fast working looms. It is indeed essential to avoid all shocks of the shuttle on its entry into the box as well as when it leaves the latter. This double condition can be ensured by locking the shuttle when it enters the box and by unlocking it, at least partially and in a duly controlled way, before it leaves the box. In fact, a total release of the shuttle might give rise to shocks when struck by the lay.

On the other hand, one object which must absolutely be attained is that the shuttle which has entered the box be correctly bearing against the bottom of the latter whilst retaining a slight braking action at the beginning of the pick.

Another requirement is that the actuating mechanism of the locking and unlocking device peculiar to each box, respectively to each shuttle, be a single mechanism controlled by the picking shaft itself, so as to easily ensure perfect synchronism between the actual pick and the unlocking of the shuttle immediately before the pick.

The object of the present invention is a comparatively simple and sturdy mechanism which fulfils this single control for all the shuttles of a rising box.

This mechanism belongs to the type which comprises an individual locking mechanism for each compartment of the box and a single means for actuating at the proper moment each one of these locking, respectively unlocking, devices when they are brought to the level of the shuttle trajectory.

According to the present invention, each individual locking device comprises substantially, in combination, at least one strip which is parallel or approximately parallel to the back wall of the compartment; a means for rigidly holding aforesaid strip in the position in which it locks the shuttle; a pusher by means of which aforesaid locking means can be withdrawn; means for holding elastically aforesaid strip in the position in which it releases the shuttle; and means for preventing longitudinal displacements of aforesaid shuttle.

Concerning the single device for actuating at the proper moment aforesaid individual locking devices, it consists, according to another main characteristic feature of the present invention, of a single pushing device located in the plane comprising the center line of all superposed pushers which are connected to the picking shaft by means of an appropriate kinematic connection.

The individual locking devices as well as the single actuating device can be designed in a variety of forms and each of their characteristic parts can vary with respect to its form, dimensions and relative positions whilst fulfilling the same functions and performing the same technical effects and results.

Another object of the present invention concerns the very characteristic design of the means for rigidly holding the strip in its locking position, without being prevented from being easily withdrawn by the mere displacement of the corresponding pusher.

Still another object of the present invention is to be found in the fact that aforesaid means for rigidly holding the strip in its locking position is stabilized by an appropriate elastic element which draws the parts of which aforesaid means is built up toward its pusher into a position which is opposite to that of the position of withdrawal.

Still another object of the present invention concerns the simple means for preventing longitudinal movements of the strip, consisting of a connecting rod hinged at both ends, i.e., on the one hand to a pivot connected to the box and, on the other hand, to a pivot connected to the strip, this connecting rod being approximately aligned in the lengthwise direction of the strip.

Still another object of the present invention concerns the design of the locking mechanism in such way that it can not only be adapted to the width of the shuttles which are being employed, but that it can also quite easily take up any play due to wear.

Still another object of the present invention concerns the characteristic disposition of aforesaid locking means; when aforesaid shuttle is in the released position, there is an elastic local pressure acting on the shuttle in order to confer to the latter a good stability at the moment when it is propelled, and also that this local pressure can be easily adjusted after unlocking.

Still another characteristic feature of the present invention concerns the particular conformation and disposition of the single means for actuating the various pushers in such way that aforesaid mechanism might follow the displacements of the lay without any motion which could be detrimental to the proper operation of the locking mechanism.

All these various objects of the present invention as well moreover as the original characteristic dispositions, will appear more clearly from the detailed, nonlimitative description given below with reference to the accompanying drawings of which:

FIGURE 3 is a side view of the device represented in FIGURE 2;

FIGURE 4 is a cross section along the straight line IV—IV of FIGURE 2, in which the locking mechanism is represented in the neutral position and preadjusted for a broad shuttle;

FIGURE 5 is a view similar to that of FIGURE 4, with this difference that the locking mechanism has been preadjusted for a narrow shuttle;

FIGURE 6 is a view similar to FIGURE 4, in which the mechanism is illustrated in its locking position after entry of a shuttle;

FIGURE 7 is a view similar to that of FIGURE 6, in which however the mechanism has been illustrated in a position of release before the shuttle is driven away.

Figure 1:
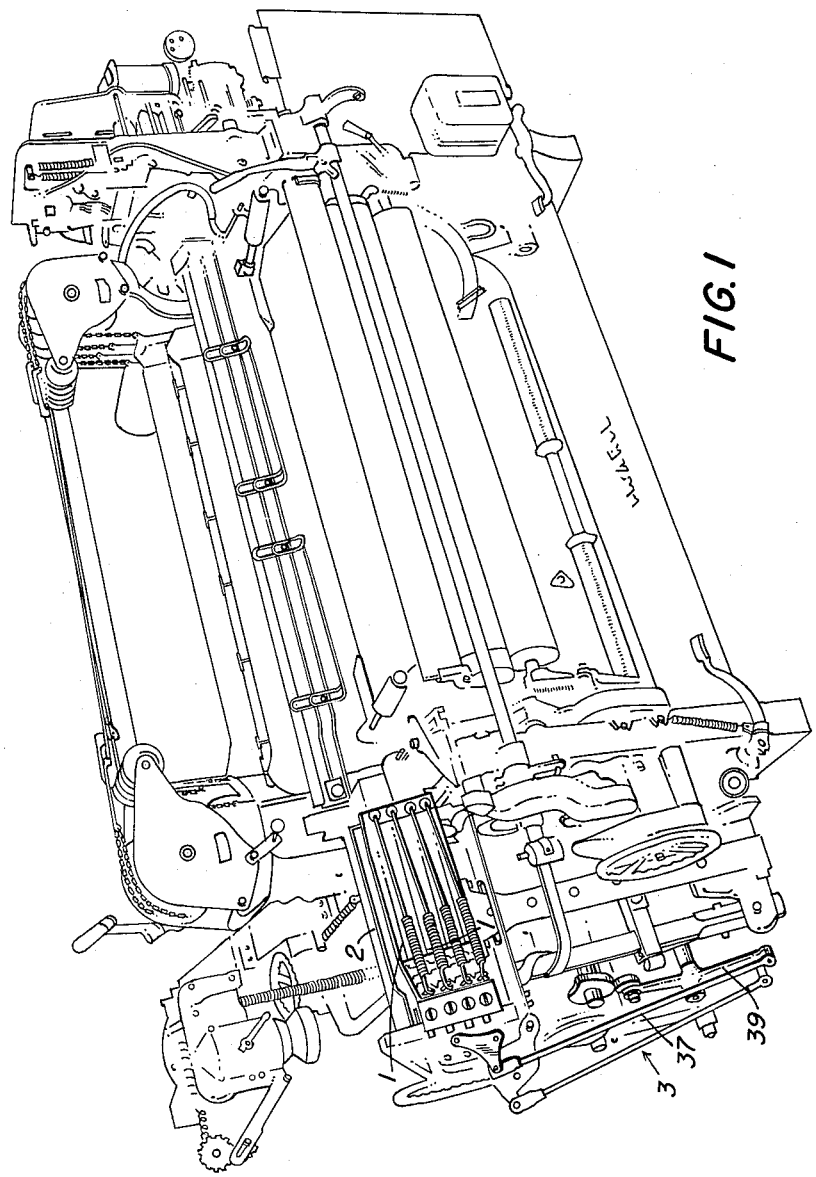
FIGURE 1 is a diagrammatic general view illustrating the location of the locking and unlocking mechanism of the shuttles on a rising box loom.

The mechanism conforming to the present invention, as represented in a particular form of embodiment in the accompanying drawings, is composed essentially of a locking mechanism 1 for each compartment of the rising box 2 and of a common single mechanism 3 for actuating at the proper moment each one of aforesaid individual locking devices. Aforesaid rising box 2 is divided into four compartments, each of which is intended to house a shuttle, and each one of these compartments is provided with such a locking device 1.

Aforesaid rising box is carried by the lay 4 and, by means of an appropriate mechanism, is displaced with respect to aforesaid lay in such manner that, for each pick, the compartment corresponding to the weft required by the pattern, respectively the pattern mechanism, is held at level X–Y of the trajectory of the shuttle.

As illustrated for instance in FIGURE 4, each compartment has a back wall 5 against which the shuttle 6 must be applied at the end of its stroke through the medium of the actual braking element which, in the present instance, is formed by the strip 7. The latter can be designed in various forms and made of various materials. In the present instance, aforesaid strip consists of a wooden core 8 lined with a certain thickness 9 of some material which is very resistant to wear but does not cause any damage to the shuttle, such as specially treated leather for instance, and between aforesaid wooden core 8 and aforesaid thickness of leather 9, there is an insert of a layer 10 of some resilient material such as for instances some rubber-containing composition. Aforesaid strip 7 has, toward its end which is nearest to the end of stroke of the shuttle in the box, a shaped notch 11 of cylindrical appearance, extended toward the free end of the strip by a flared entrance 12. The notch 11 is engaged by the cylindrical head of a connecting rod 13 the other end of which, also shaped as a cylindrical head, engages the corresponding notch 14 provided at the end of a lever 15 hinged about pivot 16. The latter rests on the head 17 of a threaded rod 18 fastened to a support 19 connected to the box 2 by means of the nuts 20–21. The latter make it possible to displace longitudinally, respectively to adjust, the position of aforesaid threaded rod 18 together with all the elements which depend on it either directly or indirectly.

Onto aforesaid lever 15, in the vicinity of its notch 14, is fastened one of the ends of a tape 22 which, whilst resting against the lower part of aforesaid lever, is fastened by its other end to an eyelet 23 of strip 7, a spring 24 being inserted between both sections of aforesaid tape 22. Toward its end, near the end of stroke of the shuttle, strip 7 is hinged by means of a pivot 25 to one of the ends of a connecting rod 26 the other end of which is supported by a pivot 27 fastened to the box 2. This connecting rod lies parallel or nearly parallel to the strip which it must hold against longitudinal dispacement. Toward its other end, aforesaid strip 7 is normally applied against a fixed stop 28 which is fastened to the corresponding compartment of the box. Aforesaid lever 15 carries a lateral arm or grip 29 by means of which it can be moved by hand. Facing the part where the connecting rod 13 engages lever 15, there is a pusher 30 which is positively guided over the larger part of its length, by a tubular element 31.

The single mechanism 3 for actuating at the proper moment aforesaid individual locking devices 1, substantially consists of a bell-crank lever 32 which can oscillate about a pivot 33. The free end of one of the branches of the bell-crank lever carries a pivot 34 onto which is mounted a roller 35, preferably rotating on ball-bearings. At the free end of the second branch, aforesaid bell-crank lever is hinged, by means of a pivot 36, to the end of a rod 37 the other end of which is hinged, by means of a pivot 38 to the end of one of the branches of a rocking lever 39 oscillating about pivot 40 attached to the frame 41 of the loom. The other branch of aforesaid rocking lever carries at its end a pivot 42 onto which is mounted a roller 43 which shall also preferably be rotating on ballbearings. This roller 43 is permanently applied against a cam 44 by means of a spring 45 inserted between aforesaid rocking lever 39 and a fixed point on the frame 41. Cam 44 is fastened to the rocking shaft 46 which latter is driven by the crankshaft diagrammatically illustrated at 47, by well known means (not represented).

The operation of the locking and unlocking mechanism conforming to the present invention is extremely simple and takes place in the following way: as the rocking shaft 46 rotates half as fast as the crankshaft 47 it results therefrom that cam 44 pushes back roller 43 after each two picks because, on looms with rising box, the displacements of aforesaid box can only occur when the shuttle has reentered its compartment, i.e., when it has performed two picks. Roller 43 drives rocking lever 39 which, in turn, pushes back periodically rod 37 and the latter causes each time bellcrank lever 32 to swing about its pivot 35 in the plane comprising the axis of the various stepped pushers 30. Roller 35 will thus each time push back the pusher which lies in this trajectory and aforesaid pusher will be determined by the position of the box, position which in turn depends on the pattern mechanism of the loom, mechanism which is well known as such (not represented). The pusher which is thus pushed back pushes in turn against the end of the corresponding lever 15 which swings about its pivot 16. Connecting rod 13 rocks by turning on its ends which are engaged with an easy fit in their respective grooves 11 and 14. Due to this, aforesaid connecting rod 13 exerts a pull on strip 7. The second connecting rod 26, without preventing the strip from withdrawing, opposes its longitudinal displacements. Spring 24 gets tighter and applies still more firmly the notched end of aforesaid lever 15 against the head 48 of the corresponding pusher 30. The movement of strip 7 is such that the latter moves away from the shuttle on practically its whole length, except over a part denoted by 49. The pressure exerted at this spot is an elastic pressure controlled by the tension of aforesaid spring 24.

Figure 2:
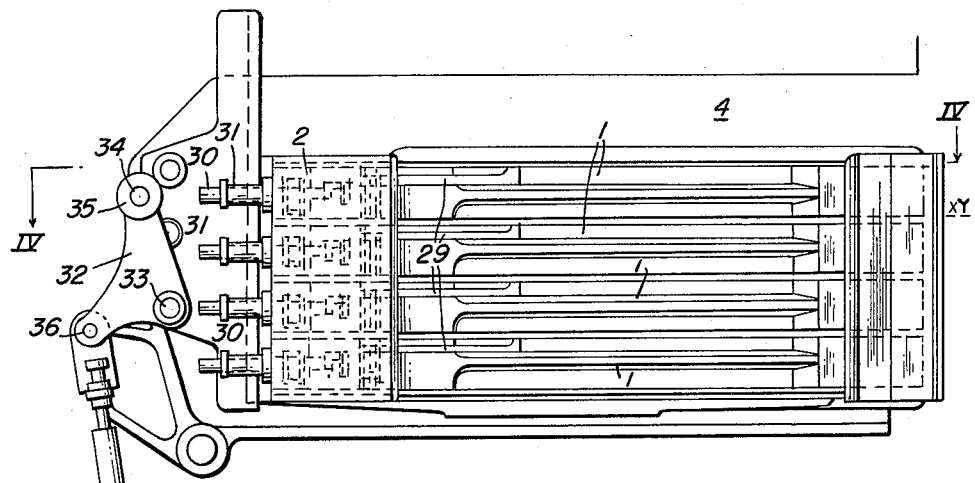
FIGURE 2 is a vertical view of a box equipped with the locking and unlocking mechanism conforming to the present invention.
Figure 2:
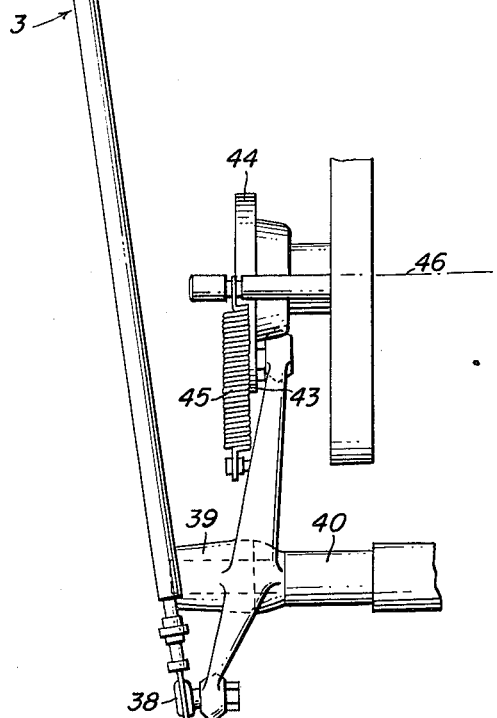

Hence, if one considers for instance the strips adjusted for applying a braking action on shuttles 6 of greater width—as illustrated in FIGURE 6—the result will be that, when aforesaid shuttle enters into the box (in the direction of arrow F), it will undergo a tangential braking stress which is largely sufficient for stopping and holding it correctly at the end of its stroke. The lateral stress imparted by the shuttle at its entry into the box is transferred to strip 7, which latter is rigidly maintained in its locking position because of the fact that, as shown diagrammatically in aforementioned FIGURE 6, the lever 15 rests against the head 48 of the corresponding pusher 30 under such conditions that aforesaid lever 15 as well as connecting rod 13 are slightly offset in the opposite direction to that of the unlocking motion. In fact, this provides a rigid bearing. The only intervening factor is the resiliency of the inserted layer 10. This state of locking will be maintained as long as aforesaid shuttle 6 must not be propelled again, because spring 24 holds aforesaid lever 15 in aforesaid locked position. On the contrary, when due to a displacement of the box in correlation with the motions controlled by the pattern mechanism, the compartment containing the shuttle to be propelled is brought to the level of the trajectory indicated by X–Y in FIGURE 2, lever 32, on account of the motion which displaces it just before the propulsion operation, draws back the corresponding pusher 30, as illustrated in FIGURE 7. As was described previously, strip 7 is withdrawn by the rotation of lever 15 and of connecting rod 13 whilst toward the front part of shuttle 6, at the place denoted by 49 in FIGURE 7, it is still subjected to an elastic pressure which is sufficient for avoiding all unwanted displacement of aforesaid shuttle and hence any detrimental shock before or during the propulsion. As the lay displaces aforesaid shuttle in the direction of arrow F′, the remaining pressure does not give rise to any detrimental resistance and is certainly not sufficient for causing either the shuttle or the strip to be heated in a dangerous way.

It will be noticed that hand operation of the locking and unlocking mechanism is extremely simple and made easy by the grip 29 of aforesaid lever 15. For adjusting, at the start, the locking mechanism to fit narrower shuttles, or for taking up the play which might result from wear after some time of service, all that needs be done is to alter the initial position of lever 15 by screwing or unscrewing the nuts 20–21, as the case may be.

As the rising box is carried by the lay, whereas the single mechanism which controls the pusher is independent thereof, it is necessary to take all required dispositions for avoiding any interfering auxiliary motion. In the present mechanism, this problem is solved in an extremely simple and thorough manner. In fact, as illustrated in FIGURE 3, provision has been made for the pivot 38 connecting rocking lever 39 to rod 37 to be located as near as possible to the swinging axis 50 of the lay diagrammatically represented at 4.

As the above form of embodiment has only been described by way of example, it is obvious that any part or device thereof can be replaced by any other part or device which is technically equivalent or fulfills the same function.

The present invention concerns the mechanism as described in the most general way, as well as its characteristic parts and devices.

What I claim is:

1. Apparatus for locking shuttles against the rear walls of the compartments in the rising box of a loom comprising: an elongated strip associated with each of said compartments; means supporting each strip adjacent its associated compartment and parallel spaced with the rear wall thereof while permitting transverse movement of said strip; a separate lever associated with each strip pivoted at one end to the rising box and operatively connected at its other end with said strip for imparting transverse movement to said strip when said lever is swung about its pivoted end; elastic means connected with said lever and tending to swing it in one direction for moving said strip transversely in the direction of said rear wall thereby locking a shuttle located in said compartment against said rear wall; a pusher for swinging said lever in an opposite direction for moving said strip transversely in a direction away from said rear wall for unlocking the shuttle; and means for actuating said pusher.

2. Apparatus for locking shuttles in accordance with claim 1 wherein the other end of said lever and said strip are provided with cylindrical notches, and a connecting rod having cylindrical projections at its ends engaged in said notches, said pusher engaging said other end of said lever.

3. Apparatus for locking shuttles in accordance with claim 2 wherein said lever is provided with an elongated grip for swinging said lever by hand.

4. Apparatus for locking shuttles in accordance with claim 2 wherein said elastic means comprises a tape section connected at one end with the other end of said lever and extends around the pivoted end of said lever, another tape section connected at one end with said rising box, and a tension spring interconnecting the other ends of said tape sections.

5. Apparatus for locking shuttles in accordance with claim 1 wherein the means supporting each strip adjacent its associated compartment comprises a connecting rod pivoted at one end to the rising box and pivoted at its other end to one end of said strip, said strip at its other end being connected to a stop on the rising box.

6. Apparatus for locking shuttles in accordance with claim 5 wherein the pivot about which said lever swings is carried on an adjustable support the positioning of which relative to said rising box being variable to provide that the strip can be displaced relative to the rising box for use with shuttles of various sizes.

7. Apparatus for locking shuttles in accordance with claim 1 wherein each strip comprises a core, a resilient lining covering one side of the core, and a strip of leather covering said lining.

8. Apparatus for locking shuttles in accordance with claim 1 wherein the means for actuating the pusher comprises a bell crank lever pivoted intermediate its ends to said rising box, a roller carried at one end of said bell crank lever for engaging said pusher, a rocking lever and a rod connecting one end of said rocking lever with the other end of said bell crank lever for oscillating said bell crank lever to bring said roller into engagement with said pusher.

References Cited by the Examiner

UNITED STATES PATENTS

| 775,308 | 11/04 | Ott | 139—185 |
| 1,819,946 | 8/31 | Damico | 139—187 |
| 1,924,187 | 8/33 | Gordon | 139—187 |
| 2,682,897 | 7/54 | Schwabe | 139—187 X |
| 2,699,184 | 1/55 | Bergstrom et al. | 139—187 |
| 2,710,030 | 6/55 | Work | 139—187 |

FOREIGN PATENTS

| 573,600 | 4/33 | Germany. |
| 8,802 | 1901 | Great Britain. |
| 12,503 | 1911 | Great Britain. |

DONALD W. PARKER, *Primary Examiner.*

RUSSELL C. MADER, *Examiner.*